United States Patent Office 3,728,189
Patented Apr. 17, 1973

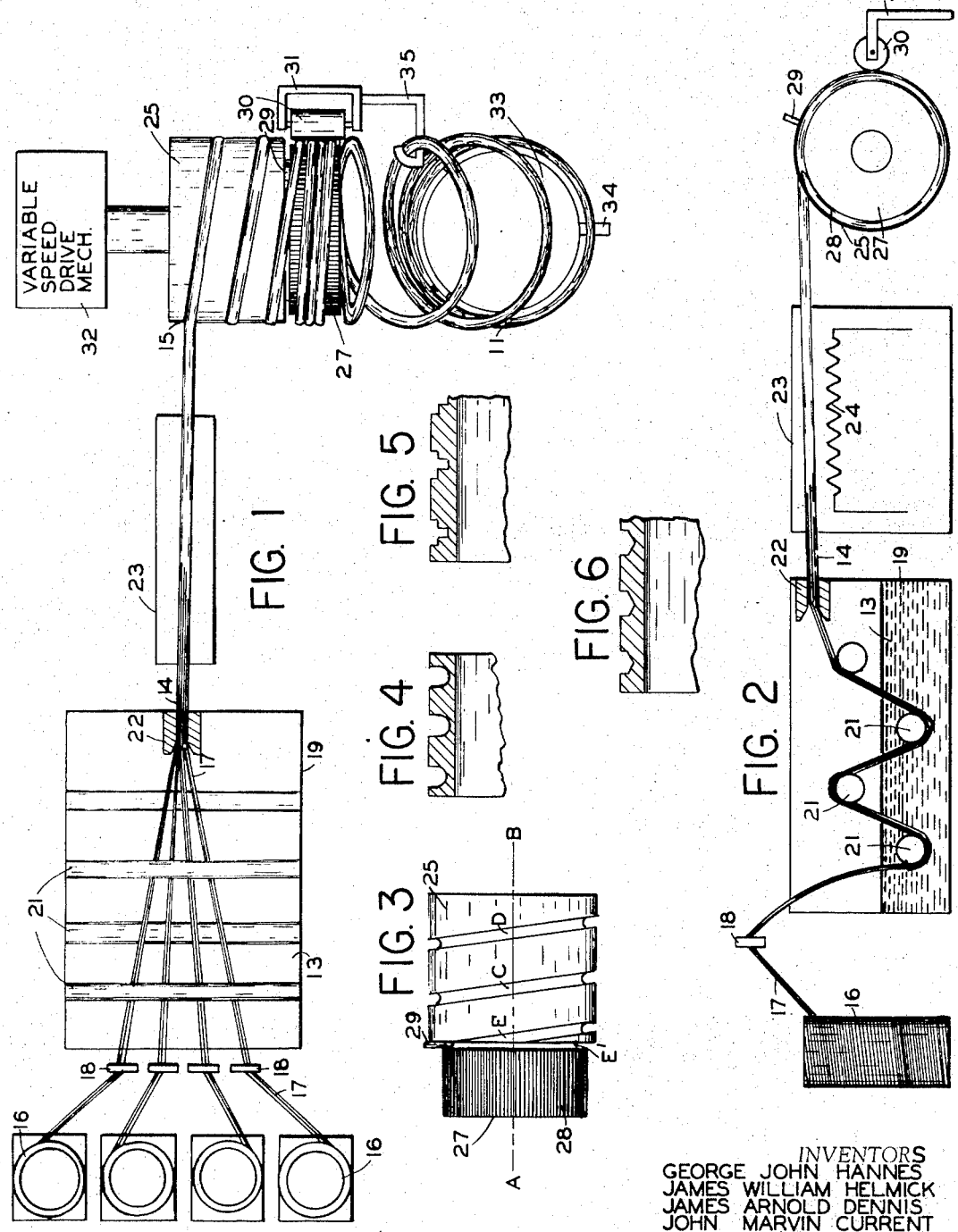

3,728,189
METHOD AND APPARATUS FOR FABRICATING A PLURALITY OF FILAMENTS INTO A HELIX
George John Hannes, Maumee, James William Helmick, Toledo, James Arnold Dennis, Perrysburg, and John Marvin Current, Jerry City, Ohio, assignors to Johns-Manville Corporation, New York, N.Y.
Filed June 6, 1969, Ser. No. 830,949
Int. Cl. B29h 9/02; B65h 81/00
U.S. Cl. 156—173                                      4 Claims

ABSTRACT OF THE DISCLOSURE

Method and apparatus for producing a helix by pulling a plurality of filaments through a resin bath, over a tensioning means through an orifice, and through a heating section for a first stage cure. The partially cured strand is drawn around a heated, stationary, helical forming surface upon which it is cured to mechanically stable form. The forming surface establishes the pitch of the helix, its inside diameter and the cross section of each turn. A drive hub having a knurled surface to frictionally engage the inner diameter of the cured helix is axially aligned with the forming surface and is driven at a suitable speed to enable the resin filled strand to be precured and finally cured in the time and at the temperature developed during the pass through the heating section and over the forming surface.

BACKGROUND OF THE INVENTION

Heretofore efforts have been made to produce helices by molding filaments embedded in a resin. In Reinhart et al. Pat. 2,852,424 of Sept. 16, 1958, for "Reinforced Plastic Springs," a length of glass roving is formed into a loose untwisted yarn, impregnated with liquid resin, drawn into a flexible tube, and while encased, wound on a mandrel into a helix. The resin is cured while the assembly is maintained on the mandrel and thereafter the tube enclosed helix is removed from the mandrel and the tube stripped away. As a practical matter the length of helices formed by this method is limited and the process is expensive and time consuming.

A reuseable mold in the form of inner and outer endless belts respectively providing inner and outer interfitting mold faces are carried in helical paths along rotating drums in Medney Pat. 3,378,426 of Apr. 16, 1968, for "Apparatus For Forming Continuous Helical Coils of Resin Bonded Glass Fibers." In this approach the belts and the raw glass fibers with their bonding material are superimposed at their introduction to the drum and separated as they are removed from the drum while drum rotation carries any given length of the mated belts and glass fibers along the drum.

SUMMARY OF THE INVENTION

The present invention relates to a method of and apparatus for continuously forming helices of bonded filaments and particularly to methods and apparatus which impose no apparatus constraints on the processing parameters required for the materials forming the helices.

An object of the invention is to simplify the method of forming helices and the apparatus required to form helices.

Another object is to avoid manipulation of mold structures for helices of bonded fifilaments.

A third object is to stabilize the transverse dimensions of helices by minimizing spring back and deformation in that dimension.

A fourth object is to produce desired helix turn cross-sections for various applications.

In accordance with the above objects, a principal feature of this invention is the drawing of a strand of resin coated filaments over a stationary, continuous, forming surface of the desired helical form and the desired cross-sectional form under conditions which permit curing the helix to a mechanically stable condition while on the forming surface.

DESCRIPTION OF THE DRAWING

FIG. 1 is a schematic plan view of one form of apparatus for producing helices according to the method of this invention;
FIG. 2 is a side view of the apparatus of FIG. 1;
FIG. 3 is a detailed plan view of the forming surface and strand pulling means according to this invention; and
FIGS. 4 through 6 are partial cross-sectional views of the forming surface for helices having cross-sections respectively which are semicircles, T-shaped, and triangular.

DISCLOSURE OF THE PREFERRED EMBODIMENT

Helices 11 of glass or other filaments are formed according to this invention by coating the filaments with a bonding resin 13, gathering a plurality of the filaments into a strand of tow 14, drawing the strand along a forming surface 15 having the form as to helix diameter, helix cross-section and pitch of the helix ultimately desired, and curing the resin of the strand to a mechanically stable form while it is drawn over the forming surface 15. In practice, as shown in FIGS. 1 and 2, a helix of 8-inch nominal inside diameter of ⅛ inch by ⅛ inch cross-section and approximately ¾ inch pitch is produced from four cakes 16 of glass roving 17 made up of 60 ends of strand, each made of 200 continuous glass filaments approximately 9 microns in diameter. The roving 17 is drawn through rings 18 and into a tank 19 containing a resin 13. Wetting of the filaments and strands by the resin is enhanced by subjecting them to tension as they are carried over a serpentine path defined by the rods 21 in tank 19. The tensioning by rods 21 also equalizes the tension on the individual strands to enhance the handling characteristics of the tow resulting from the combination of the roving strands. The four runs of roving are gathered through an orifice 22 which imposes further tension on the resulting strand of resin filled tow 14 and meters the resin content of the tow.

Resin 13, which may be phenolic in liquid form containing 64% of solids and diluted by volume with 3 parts ethynol to 4 parts phenolic, is retarded in its curing until it is applied to the filaments by maintaining it at a relatively low temperature. Upon its withdrawal from tank 19 and its passage through metering orifice 22, it is heated to enhance its flow characteristics thereby facilitating more complete coating of the filaments, driv-off some of the volatiles in the resin and initiating its cure to produce a skin on the filled strand of tow 14. A heating chamber 23 is oriented along the path of the strand of resin filled tow to raise its temperature and institute curing. Where speeds of advance of the strand of the order of 200 to 400 inches per minute are employed, a tunnel of four to eight feet in length is heated as by an electrical resistance heater which can be heated to 700° to 1100° F. and oriented to heat the metallic walls of the tunnel.

From the chamber 23, the strand of resin coated tow is carried over a forming surface 15 of helical form according to the helix sought to be produced. A forming surface 15 is advantageously provided as a groove or trough in a stationary forming wheel or cylinder 25 as best seen in FIG. 3. The helix resin is cured to a mechanically stable state while drawn across the forming surface by heating that surface. In the case of cylinder 25, electrical resistance heaters (not shown) can be positioned in proximity to the mass of the cylinder to establish the desired cure temperature for the time interval each incremental length of the helix is in contact with the forming groove 15. As is well known, the temperature san be established and maintained by suitable sensing means such as thermocouples, and controls responsive thereto (none of which are shown). Temperatures in the range of 650° to 850° F. are suitable to cure the resin of the strand to a helix in a range of 300 radial degrees to 540 radial degrees for the dwell time on a forming wheel 25 having an inner diameter at the bottom of forming groove 15 of eight and seven-eighths inches, an outer diameter of nine inches, when the strand is pulled along the forming groove at eight to twelve revolutions per minute.

Alternative forming and curing means are available. A trough supported on a cylinder or on a spider can provide a forming surface which can be heated directly or can be maintained in an oven. The requisites of the forming process are that each incremental length of the resin filled strand of tow be maintained in the desired helical form and desired helix turn cross-section for a combination of time and temperature to insure sufficient curing of the resin to a mechanically stable state maintaining the desired form. As is known for such cures, within limits, a given degree of cure is a function of time which decreases with increased temperature.

It should be noted that the partially cured skin developed in the resin filled strand of tow 14 in the preheater section enables the strand to be drawn along the forming surface 15 without the buildup of material on that surface. This permits continuous processing of the strand 14 in any desired length since it avoids the necessity of interrupting the process to clean the surface 15.

The pulling force is imparted to the strand 14 to draw it through the processing apparatus by a pulling hub 27 having a traction surface 28 engageable with the inner face of the cured helix as it is drawn from the forming surface 15. The pulling hub 27 is mounted in axial alignment with the axis of the helical forming surface 15 and rotated in the direction of the pitch of the helix at a speed determined by the cure time desired at the processing stages of the apparatus. In practice the diameter of the pulling hub 27 corresponds to the inner diameter of the forming surface 15 as measured at the bottom of that surface, and its traction surface 28 is knurled. In the case of forming wheel 25, the pulling hub 27 is axially spaced therefrom and a guide finger 29 is mounted adjacent the end of the forming surface 15 to displace the helix to the hub. The hub 27 is of a length to accommodate turns of the formed helix. As illustrated, the helix turns are essentially parallel on the hub since the turns can be displaced from the pitch readily. Traction of the helix on the hub is enhanced by a pressure roller 30 biased against the helix and toward the hub and mounted for rotation on yoke 31.

The drive 32 for hub 27 may be of a variable speed type and is located on the opposite side of forming wheel from helix collection station 33 to avoid interference with the helix as it issues from hub 27. The rotational position of the forming surface 15 around its axis can be adjusted to accommodate the desired dwell time of the helix on that surface. Thus, if the strand of resin filled tow is introduced tangentially of the forming wheel 25 as at a point on line A–B of FIG. 3, it might have 360° of dwell if introduced at point C of 720° if introduced at point D since that travel would be required to reach exit E. Rotation of the wheel 60° to position exit E at E' would reduce the dwell from C to 300° or from point D to 660°. In a similar manner other rotational positions can be chosen to establish desired dwell time, and in cooperation with the speed of drive 32, establish the cure time for the resin.

The cured helix is deposited at a collection station 32 adjacent pulling hub 27 which can be of a dome-shaped spindle having radially projecting fingers 34. A guide drum 35 picks up the helix as it separates from the pulling hub to guide the cured strand through a turn of 90° so that the axis of the helix is vertical at station 33.

Various cross-sections can be imparted to the helix as it is drawn across the forming surface. As illustrated in FIGS. 4 through 6, the surfaces can be semicircular as in FIG. 4, T-shaped as in FIG. 5, or triangular as in FIG. 6. The apparatus is adapted to produce these various cross-section forms and various helix diameters and pitches by substituting appropriate forming surfaces 15, pulling hubs 27 and collecting stations 33. Thus, where a helix of an inside diameter of fourteen inches is to be produced, a forming wheel 25 of that diameter at the base of the forming groove 15 is mounted at the forming station, a pulling hub 27 of that diameter is mounted on drive 32, the holddown roll 29 is appropriately reoriented and a collecting station 33 spindle of the correct size is substituted. Processing parameters are adjusted according to the cure required of the resin mass. Where the cross-sectional area of the helix turns is unchanged, the speed of rotation of the pulling hub is reduced to maintain the preliminary cure and forming surface cure within the required limits. In the case of a 14-inch diameter, helix of a 1/8" by 1/8" semicircular bottomed cross-section, the preheater temperature can be in the range of 900 to 1100° F., the forming temperature can be 650 to 850° F. and the pulling hub speed can be 4 to 8 r.p.m.

It is to be understood that the above described method and apparatus lend themselves to numerous modifications, that they are presented as illustrative of this invention, and that they are not to be read in a limiting sense.

What is claimed is:

1. A method of forming a helix of bonded filaments comprising: coating filaments with a binder, gathering said filaments into a strand, introducing said strand to a stationary heated forming surface which confines said strand and has a configuration of the helix being formed, drawing said strand of gathered filaments along said forming surface at a speed correlated with the curing characteristics of said binder, the temperature of said forming surface and the length of time of contact with said forming surface to sufficiently cure the binder to establish the strand in said helix form, and drawing said strand off said forming surface.

2. The method according to claim 1 including the step of drawing the coated filaments through an orifice to enhance the wetting of the filaments by the binder and to monitor the amount of binder applied.

3. The method according to claim 1 including the step of subjecting the strand of coated filaments to a preliminary curing prior to the introduction of the strand to the forming surface whereby the binder is partially cured to form a skin on the strand.

4. A method according to claim 1 wherein said filaments are fiber glass, said binder is a phenolic of approximately 64% solids diluted approximately 3 parts of ethynol to 4 parts of phenolic, including the steps of immersing the filaments in a bath of binder, tensioning said filaments by passing them over guides in the binder defining a serpentine path, drawing said filaments as a gathered strand of approximately 60 ends through an orifice of .011 inch diameter, partially C-staging the binder of said strand in an elongated preheater of 4 to 8 feet in length at a temperature of 700 to 1100° F.; wherein said forming surface for said partially cured strand is a stationary forming wheel having a guide slot of helical form of approximately 1½ turns on said wheel, with approximately a ¾-inch pitch; and a ⅛ by ⅛ inch cross-section with a radial bottom; heating said forming wheel to 650 to 850° F.; and wherein said drawing speed is between 200 and 400 inches per minute.

References Cited

UNITED STATES PATENTS

| | | | |
|---|---|---|---|
| 2,629,894 | 3/1953 | Boggs | 156—175 X |
| 2,852,424 | 9/1958 | Reinhart et al. | 267—149 X |
| 2,980,158 | 4/1961 | Meyer | 156—175 |
| 3,084,087 | 4/1963 | Weil et al. | 156—173 X |
| 3,281,299 | 10/1966 | Shobert | 156—175 |
| 3,378,426 | 4/1968 | Medney | 156—430 |
| 3,449,199 | 6/1969 | Mead | 156—173 X |

FOREIGN PATENTS

| | | | |
|---|---|---|---|
| 223,965 | 7/1958 | Australia | 267—149 |
| 1,029,417 | 12/1950 | France | 156—175 |

CARL D. QUARFORTH, Primary Examiner
R. S. GAITHER, Assistant Examiner

U.S. Cl. X.R.

156—143, 161, 169, 180, 195, 431; 264—281